US012652590B2

(12) United States Patent
Xie et al.

(10) Patent No.: US 12,652,590 B2
(45) Date of Patent: Jun. 9, 2026

(54) TECHNIQUES FOR USING A FIRST SUBSCRIPTION OF A USER EQUIPMENT TO PERFORM IDLE MODE OPERATIONS FOR A SECOND SUBSCRIPTION OF THE USER EQUIPMENT

(71) Applicant: QUALCOMM Incorporated, San Diego, CA (US)

(72) Inventors: Ling Xie, Beijing (CN); Qingxin Chen, San Diego, CA (US); Reza Shahidi, San Diego, CA (US); Jiming Guo, Beijing (CN); Xuqiang Zhang, Beijing (CN); Kiran Patil, San Diego, CA (US); Subashini Krishnamurthy, San Diego, CA (US); Peng Hu, Beijing (CN); Xuepan Guan, San Diego, CA (US); Daowei Lin, Shenzhen (CN); Shaolin Peng, San Jose, CA (US); Vishwanath Chukkala, San Diego, CA (US); Pavan Kumar V. Jigajinni, San Diego, CA (US); Bhupesh Manoharlal Umatt, Poway, CA (US); Rishika Tindola, Hyderabad (IN); Xiaochen Chen, Beijing (CN); Tom Chin, San Diego, CA (US); Xiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 17/597,224

(22) PCT Filed: Jul. 28, 2020

(86) PCT No.: PCT/CN2020/105253
§ 371 (c)(1),
(2) Date: Dec. 29, 2021

(87) PCT Pub. No.: WO2021/018146
PCT Pub. Date: Feb. 4, 2021

(65) Prior Publication Data
US 2022/0312280 A1     Sep. 29, 2022

(30) Foreign Application Priority Data
Jul. 31, 2019     (WO) ................ PCT/CN2019/098530

(51) Int. Cl.
*H04W 36/00* (2009.01)
*H04W 8/18* (2009.01)
(Continued)

(52) U.S. Cl.
CPC ....... *H04W 36/0085* (2018.08); *H04W 8/183* (2013.01); *H04W 68/00* (2013.01); *H04W 76/15* (2018.02); *H04W 88/06* (2013.01)

(58) Field of Classification Search
CPC . H04W 36/0085; H04W 8/183; H04W 36/08; H04W 68/00; H04W 88/06; H04W 76/15
See application file for complete search history.

(56) References Cited

U.S. PATENT DOCUMENTS

| | | | |
|---|---|---|---|
| 9,264,887 B2 | 2/2016 | Goel et al. | |
| 9,402,274 B1 | 7/2016 | Rajurkar et al. | |
| (Continued) | | | |

FOREIGN PATENT DOCUMENTS

| | | |
|---|---|---|
| CN | 102036350 A | 4/2011 |
| TW | 201408101 A | 2/2014 |
| (Continued) | | |

OTHER PUBLICATIONS

International Search Report and Written Opinion—PCT/CN2020/105253—ISA/EPO—Sep. 21, 2020.
(Continued)

*Primary Examiner* — Omer S Mian
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine that a first subscription of the UE and a second subscription of the UE are associated with a same cell and are being used for a same radio access technology (RAT). The UE may activate a proxy subscription mode for the first subscription based at least in part on the determination that the first subscription of the UE and the second subscription of the UE are associated with the same cell and are being used for the same RAT, wherein the proxy subscription mode enables the UE to use the first subscription to perform one or more idle mode operations for the second
(Continued)

subscription while the second subscription is in an idle mode. Numerous other aspects are provided.

30 Claims, 9 Drawing Sheets

(51) Int. Cl.

| | | |
|---|---|---|
| *H04W 68/00* | (2009.01) | |
| *H04W 76/15* | (2018.01) | |
| *H04W 88/06* | (2009.01) | |

(56) References Cited

U.S. PATENT DOCUMENTS

| | | | | |
|---|---|---|---|---|
| 2016/0323256 | A1* | 11/2016 | Shahidi | H04W 12/06 |
| 2016/0353516 | A1* | 12/2016 | Rajurkar | H04W 8/183 |
| 2017/0048773 | A1 | 2/2017 | Miao et al. | |

| | | | | |
|---|---|---|---|---|
| 2017/0208603 | A1* | 7/2017 | Goel | H04W 36/14 |
| 2017/0230932 | A1* | 8/2017 | Challa | H04W 68/02 |
| 2017/0325144 | A1* | 11/2017 | Raghunathan | H04W 36/305 |
| 2018/0368099 | A1 | 12/2018 | Chen et al. | |
| 2019/0090280 | A1 | 3/2019 | Krishnamoorthy et al. | |

FOREIGN PATENT DOCUMENTS

| | | | |
|---|---|---|---|
| WO | 2015195459 | A1 | 12/2015 |
| WO | 2016190952 | A1 | 12/2016 |
| WO | 2016191000 | A1 | 12/2016 |

OTHER PUBLICATIONS

International Search Report and Written Opinion—PCT/CN2019/098530—ISA/EPO—Apr. 24, 2020.
Supplementary European Search Report—EP20848104—Search Authority—Munich—Jun. 5, 2023.

* cited by examiner

400

310a
Cell 1
315a

310b
Cell 2
315b

SIM 1
(SUB 1)
305a

SIM 2
(SUB 2)
305b

UE
120

405
Determine that SUB 1
and SUB 2 are
associated with same
cell (and/or same
network operator) and
same RAT 410
Activate proxy subscription mode (PSM)

- SUB 1 connected and SUB 2 idle:
  Activate PSM for SUB 1
- SUB 1 with data service and SUB2
  without data service:
  Activate PSM for SUB 1

415
Use SUB 1 to perform idle mode
operation(s) for SUB 2

700

310b
Cell 2
315b

310a
Cell 1
315a

SIM 2
(SUB 2)
305b

SIM 1
(SUB 1)
305a

UE
120

710
Deactivate proxy
subscription mode
(connect to different
cells)

705
Determine that condition
for deactivating proxy
subscription mode is
satisfied

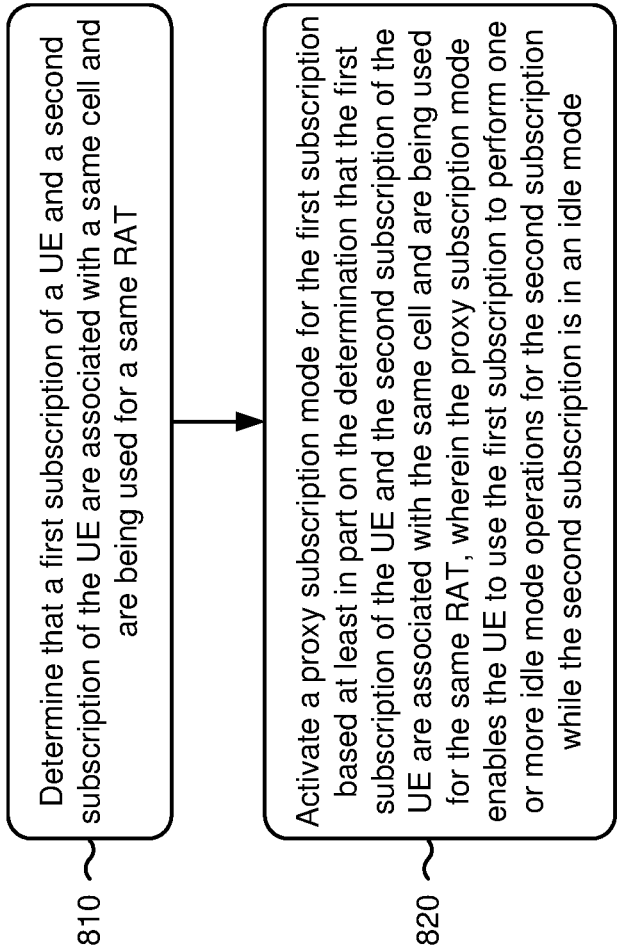

810 — Determine that a first subscription of a UE and a second subscription of the UE are associated with a same cell and are being used for a same RAT 820 — Activate a proxy subscription mode for the first subscription based at least in part on the determination that the first subscription of the UE and the second subscription of the UE are associated with the same cell and are being used for the same RAT, wherein the proxy subscription mode enables the UE to use the first subscription to perform one or more idle mode operations for the second subscription while the second subscription is in an idle mode

TECHNIQUES FOR USING A FIRST SUBSCRIPTION OF A USER EQUIPMENT TO PERFORM IDLE MODE OPERATIONS FOR A SECOND SUBSCRIPTION OF THE USER EQUIPMENT

CROSS-REFERENCE TO RELATED APPLICATIONS

This Patent Application is a 371 national stage of PCT Application No. PCT/CN2020/105253 filed on Jul. 28, 2020, entitled "TECHNIQUES FOR USING A FIRST SUB-SCRIPTION OF A USER EQUIPMENT TO PERFORM IDLE MODE OPERATIONS FOR A SECOND SUB-SCRIPTION OF THE USER EQUIPMENT," which claims priority to Patent Cooperation Treaty (PCT) Application No. PCT/CN2019/098530, filed on Jul. 31, 2019, entitled "TECHNIQUES FOR USING A FIRST SUBSCRIPTION OF A USER EQUIPMENT TO PERFORM IDLE MODE OPERATIONS FOR A SECOND SUBSCRIPTION OF THE USER EQUIPMENT," which are hereby expressly incorporated by reference herein.

FIELD OF THE DISCLOSURE

Aspects of the present disclosure generally relate to wireless communication and to techniques and apparatuses for using a first subscription of a user equipment to perform idle mode operations for a second subscription of the user equipment.

DESCRIPTION OF RELATED ART

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier fre-quency-division multiple access (SC-FDMA) systems, time division synchronous code division multiple access (TD-SCDMA) systems, and Long Term Evolution (LTE). LTE/ LTE-Advanced is a set of enhancements to the Universal Mobile Telecommunications System (UMTS) mobile stan-dard promulgated by the Third Generation Partnership Proj-ect (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunica-tion standards that employ these technologies.

SUMMARY

In some aspects, a method of wireless communication performed by a user equipment (UE) includes: determining that a first subscription of the UE and a second subscription of the UE are associated with a same cell and are being used for a same radio access technology (RAT); and activating a proxy subscription mode for the first subscription based at least in part on the determination that the first subscription of the UE and the second subscription of the UE are associated with the same cell and are being used for the same RAT, wherein the proxy subscription mode enables the UE to use the first subscription to perform one or more idle mode operations for the second subscription while the second subscription is in an idle mode.

In some aspects, the first subscription and the second subscription are associated with a same network operator.

In some aspects, the first subscription and the second subscription are associated with different network operators, and the UE is roaming on the same cell for at least one of the first subscription or the second subscription.

In some aspects, the first subscription and the second subscription are associated with different network operators that share a radio access network on the same cell.

In some aspects, the proxy subscription mode is activated for the first subscription based at least in part on a determi-nation that the first subscription is in a connected mode and the second subscription is in an idle mode.

In some aspects, the proxy subscription mode is activated for the first subscription based at least in part on a determi-nation that the first subscription is associated with a data service and that the second subscription is not associated with a data service.

In some aspects, the one or more idle mode operations include demodulating a page of the second subscription in a paging occasion configured for the second subscription.

In some aspects, the one or more idle mode operations include one or more idle mobility operations associated with the second subscription.

In some aspects, the first subscription and the second subscription are both in an idle mode.

In some aspects, the method includes using one or more measurements, obtained via the first subscription, for the second subscription based at least in part on the activation of the proxy subscription mode.

In some aspects, the one or more measurements include at least one of a serving cell measurement, a neighbor cell measurement, an intra-frequency measurement, an inter-frequency measurement, an inter-RAT measurement, or a combination thereof.

In some aspects, the method includes refraining from scheduling or performing one or more measurements using the second subscription.

In some aspects, the method includes determining that a cell priority of the first subscription has changed while the proxy subscription mode is activated; and updating a cell priority of the second subscription to match the cell priority of the first subscription based at least in part on the determination that the cell priority of the first subscription has changed while the proxy subscription mode is activated.

In some aspects, the method includes determining that a new serving cell has been selected for the first subscription while the proxy subscription mode is activated; and selecting the new serving cell for the second subscription based at least in part on the determination that the new serving cell has been selected for the first subscription while the proxy subscription mode is activated.

In some aspects, the method includes determining that system information has been updated for the first subscription while the proxy subscription mode is activated; and updating system information for the second subscription based at least in part on the updated system information for the first subscription based at least in part on the determination that the system information has been updated for the first subscription while the proxy subscription mode is activated.

In some aspects, the method includes receiving at least one of a multicast communication, a broadcast communication, or an evolved multimedia broadcast multicast services (eMBMS) communication configured or scheduled for the second subscription based at least in part on the activation of the proxy subscription mode.

In some aspects, the method includes receiving an emergency message for the second subscription based at least in part on the activation of the proxy subscription mode.

In some aspects, the first subscription is in a connected mode and the second subscription is in an idle mode.

In some aspects, the method includes determining that the first subscription has been handed over to a new cell while the proxy subscription mode is activated; determining that the second subscription is not barred from camping on the new cell in idle mode; and triggering cell reselection to the new cell for the second subscription based at least in part on the determination that the second subscription is not barred from camping on the new cell in idle mode.

In some aspects, the method includes refraining from performing one or more neighbor cell measurements scheduled in a system information block while the proxy subscription mode is activated.

In some aspects, the method includes deactivating the proxy subscription mode for the first subscription based at least in part on at least one of: a determination that at least one of the first subscription or the second subscription is out of service, a determination that the first subscription and the second subscription are being used for different RATs, initiation of a connection setup using the second subscription, initiation of a public land mobile network search using the second subscription, a determination that the first subscription has been handed over to a new cell and that the second subscription is barred from camping on the new cell in idle mode, or a combination thereof.

In some aspects, a UE for wireless communication includes: a memory; and one or more processors operatively coupled to the memory, the memory and the one or more processors configured to: determine that a first subscription of the UE and a second subscription of the UE are associated with a same cell and are being used for a same RAT; and activate a proxy subscription mode for the first subscription based at least in part on the determination that the first subscription of the UE and the second subscription of the UE are associated with the same cell and are being used for the same RAT, wherein the proxy subscription mode enables the UE to use the first subscription to perform one or more idle mode operations for the second subscription while the second subscription is in an idle mode.

In some aspects, the first subscription and the second subscription are associated with a same network operator.

In some aspects, the first subscription and the second subscription are associated with different network operators, and the UE is roaming on the same cell for at least one of the first subscription or the second subscription.

In some aspects, the first subscription and the second subscription are associated with different network operators that share a radio access network on the same cell.

In some aspects, the proxy subscription mode is activated for the first subscription based at least in part on a determination that the first subscription is in a connected mode and the second subscription is in an idle mode.

In some aspects, the proxy subscription mode is activated for the first subscription based at least in part on a determination that the first subscription is associated with a data service and that the second subscription is not associated with a data service.

In some aspects, the one or more idle mode operations include demodulating a page of the second subscription in a paging occasion configured for the second subscription.

In some aspects, the one or more idle mode operations include one or more idle mobility operations associated with the second subscription.

In some aspects, the first subscription and the second subscription are both in an idle mode.

In some aspects, the one or more processors are further configured to use one or more measurements, obtained via the first subscription, for the second subscription based at least in part on the activation of the proxy subscription mode.

In some aspects, the one or more measurements include at least one of a serving cell measurement, a neighbor cell measurement, an intra-frequency measurement, an inter-frequency measurement, an inter-RAT measurement, or a combination thereof.

In some aspects, the one or more processors are further configured to refrain from scheduling or performing one or more measurements using the second subscription.

In some aspects, the one or more processors are further configured to: determine that a cell priority of the first subscription has changed while the proxy subscription mode is activated; and update a cell priority of the second subscription to match the cell priority of the first subscription based at least in part on the determination that the cell priority of the first subscription has changed while the proxy subscription mode is activated.

In some aspects, the one or more processors are further configured to: determine that a new serving cell has been selected for the first subscription while the proxy subscription mode is activated; and select the new serving cell for the second subscription based at least in part on the determination that the new serving cell has been selected for the first subscription while the proxy subscription mode is activated.

In some aspects, the one or more processors are further configured to: determine that system information has been updated for the first subscription while the proxy subscription mode is activated; and update system information for the second subscription based at least in part on the updated system information for the first subscription based at least in part on the determination that the system information has been updated for the first subscription while the proxy subscription mode is activated.

In some aspects, the one or more processors are further configured to receive at least one of a multicast communication, a broadcast communication, or an eMBMS communication configured or scheduled for the second subscription based at least in part on the activation of the proxy subscription mode.

In some aspects, the one or more processors are further configured to receive an emergency message for the second subscription based at least in part on the activation of the proxy subscription mode.

In some aspects, the first subscription is in a connected mode and the second subscription is in an idle mode.

In some aspects, the one or more processors are further configured to: determine that the first subscription has been handed over to a new cell while the proxy subscription mode is activated; determine that the second subscription is not barred from camping on the new cell in idle mode; and trigger cell reselection to the new cell for the second subscription based at least in part on the determination that the second subscription is not barred from camping on the new cell in idle mode.

In some aspects, the one or more processors are further configured to refrain from performing one or more neighbor cell measurements scheduled in a system information block while the proxy subscription mode is activated.

In some aspects, the one or more processors are further configured to deactivate the proxy subscription mode for the first subscription based at least in part on at least one of: a determination that at least one of the first subscription or the second subscription is out of service, a determination that the first subscription and the second subscription are being used for different RATs, initiation of a connection setup using the second subscription, initiation of a public land mobile network search using the second subscription, a determination that the first subscription has been handed over to a new cell and that the second subscription is barred from camping on the new cell in idle mode, or a combination thereof.

In some aspects, a non-transitory computer-readable medium storing a set of instructions for wireless communication includes: one or more instructions that, when executed by one or more processors of a UE, cause the UE to: determine that a first subscription of the UE and a second subscription of the UE are associated with a same cell and are being used for a same RAT; and activate a proxy subscription mode for the first subscription based at least in part on the determination that the first subscription of the UE and the second subscription of the UE are associated with the same cell and are being used for the same RAT, wherein the proxy subscription mode enables the UE to use the first subscription to perform one or more idle mode operations for the second subscription while the second subscription is in an idle mode.

In some aspects, the first subscription and the second subscription are associated with a same network operator.

In some aspects, the first subscription and the second subscription are associated with different network operators, and the UE is roaming on the same cell for at least one of the first subscription or the second subscription.

In some aspects, the first subscription and the second subscription are associated with different network operators that share a radio access network on the same cell.

In some aspects, the proxy subscription mode is activated for the first subscription based at least in part on a determination that the first subscription is in a connected mode and the second subscription is in an idle mode.

In some aspects, the proxy subscription mode is activated for the first subscription based at least in part on a determination that the first subscription is associated with a data service and that the second subscription is not associated with a data service.

In some aspects, the one or more idle mode operations include demodulating a page of the second subscription in a paging occasion configured for the second subscription.

In some aspects, the one or more idle mode operations include one or more idle mobility operations associated with the second subscription.

In some aspects, the first subscription and the second subscription are both in an idle mode.

In some aspects, the one or more instructions further cause the UE to use one or more measurements, obtained via the first subscription, for the second subscription based at least in part on the activation of the proxy subscription mode.

In some aspects, the one or more measurements include at least one of a serving cell measurement, a neighbor cell measurement, an intra-frequency measurement, an inter-frequency measurement, an inter-RAT measurement, or a combination thereof.

In some aspects, the one or more instructions further cause the UE to refrain from scheduling or performing one or more measurements using the second subscription.

In some aspects, the one or more instructions further cause the UE to: determine that a cell priority of the first subscription has changed while the proxy subscription mode is activated; and update a cell priority of the second subscription to match the cell priority of the first subscription based at least in part on the determination that the cell priority of the first subscription has changed while the proxy subscription mode is activated.

In some aspects, the one or more instructions further cause the UE to: determine that a new serving cell has been selected for the first subscription while the proxy subscription mode is activated; and select the new serving cell for the second subscription based at least in part on the determination that the new serving cell has been selected for the first subscription while the proxy subscription mode is activated.

In some aspects, the one or more instructions further cause the UE to: determine that system information has been updated for the first subscription while the proxy subscription mode is activated; and update system information for the second subscription based at least in part on the updated system information for the first subscription based at least in part on the determination that the system information has been updated for the first subscription while the proxy subscription mode is activated.

In some aspects, the one or more instructions further cause the UE to receive at least one of a multicast communication, a broadcast communication, or an eMBMS communication configured or scheduled for the second subscription based at least in part on the activation of the proxy subscription mode.

In some aspects, the one or more instructions further cause the UE to receive an emergency message for the second subscription based at least in part on the activation of the proxy subscription mode.

In some aspects, the first subscription is in a connected mode and the second subscription is in an idle mode.

In some aspects, the one or more instructions further cause the UE to: determine that the first subscription has been handed over to a new cell while the proxy subscription mode is activated; determine that the second subscription is not barred from camping on the new cell in idle mode; and trigger cell reselection to the new cell for the second subscription based at least in part on the determination that the second subscription is not barred from camping on the new cell in idle mode.

In some aspects, the one or more instructions further cause the UE to refrain from performing one or more neighbor cell measurements scheduled in a system information block while the proxy subscription mode is activated.

In some aspects, the one or more instructions further cause the UE to deactivate the proxy subscription mode for the first subscription based at least in part on at least one of: a determination that at least one of the first subscription or the second subscription is out of service, a determination that the first subscription and the second subscription are being used for different RATs, initiation of a connection setup using the second subscription, initiation of a public land mobile network search using the second subscription, a determination that the first subscription has been handed over to a new cell and that the second subscription is barred from camping on the new cell in idle mode, or a combination thereof.

In some aspects, an apparatus for wireless communication includes: means for determining that a first subscription of the apparatus and a second subscription of the apparatus are associated with a same cell and are being used for a same RAT; and means for activating a proxy subscription mode for the first subscription based at least in part on the determination that the first subscription of the apparatus and the second subscription of the apparatus are associated with the same cell and are being used for the same RAT, wherein the proxy subscription mode enables the apparatus to use the first subscription to perform one or more idle mode operations for the second subscription while the second subscription is in an idle mode.

In some aspects, the first subscription and the second subscription are associated with a same network operator.

In some aspects, the first subscription and the second subscription are associated with different network operators, and the apparatus is roaming on the same cell for at least one of the first subscription or the second subscription.

In some aspects, the first subscription and the second subscription are associated with different network operators that share a radio access network on the same cell.

In some aspects, the proxy subscription mode is activated for the first subscription based at least in part on a determination that the first subscription is in a connected mode and the second subscription is in an idle mode.

In some aspects, the proxy subscription mode is activated for the first subscription based at least in part on a determination that the first subscription is associated with a data service and that the second subscription is not associated with a data service.

In some aspects, the one or more idle mode operations include demodulating a page of the second subscription in a paging occasion configured for the second subscription.

In some aspects, the one or more idle mode operations include one or more idle mobility operations associated with the second subscription.

In some aspects, the first subscription and the second subscription are both in an idle mode.

In some aspects, the apparatus includes means for using one or more measurements, obtained via the first subscription, for the second subscription based at least in part on the activation of the proxy subscription mode.

In some aspects, the one or more measurements include at least one of a serving cell measurement, a neighbor cell measurement, an intra-frequency measurement, an inter-frequency measurement, an inter-RAT measurement, or a combination thereof.

In some aspects, the apparatus includes means for refraining from scheduling or performing one or more measurements using the second subscription.

In some aspects, the apparatus includes means for determining that a cell priority of the first subscription has changed while the proxy subscription mode is activated; and means for updating a cell priority of the second subscription to match the cell priority of the first subscription based at least in part on the determination that the cell priority of the first subscription has changed while the proxy subscription mode is activated.

In some aspects, the apparatus includes means for determining that a new serving cell has been selected for the first subscription while the proxy subscription mode is activated; and means for selecting the new serving cell for the second subscription based at least in part on the determination that the new serving cell has been selected for the first subscription while the proxy subscription mode is activated.

In some aspects, the apparatus includes means for determining that system information has been updated for the first subscription while the proxy subscription mode is activated; and means for updating system information for the second subscription based at least in part on the updated system information for the first subscription based at least in part on the determination that the system information has been updated for the first subscription while the proxy subscription mode is activated.

In some aspects, the apparatus includes means for receiving at least one of a multicast communication, a broadcast communication, or an eMBMS communication configured or scheduled for the second subscription based at least in part on the activation of the proxy subscription mode.

In some aspects, the apparatus includes means for receiving an emergency message for the second subscription based at least in part on the activation of the proxy subscription mode.

In some aspects, the first subscription is in a connected mode and the second subscription is in an idle mode.

In some aspects, the apparatus includes means for determining that the first subscription has been handed over to a new cell while the proxy subscription mode is activated; means for determining that the second subscription is not barred from camping on the new cell in idle mode; and means for triggering cell reselection to the new cell for the second subscription based at least in part on the determination that the second subscription is not barred from camping on the new cell in idle mode.

In some aspects, the apparatus includes means for refraining from performing one or more neighbor cell measurements scheduled in a system information block while the proxy subscription mode is activated.

In some aspects, the apparatus includes means for deactivating the proxy subscription mode for the first subscription based at least in part on at least one of: a determination that at least one of the first subscription or the second subscription is out of service, a determination that the first subscription and the second subscription are being used for different RATs, initiation of a connection setup using the second subscription, initiation of a public land mobile network search using the second subscription, a determination that the first subscription has been handed over to a new cell and that the second subscription is barred from camping on the new cell in idle mode, or a combination thereof.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
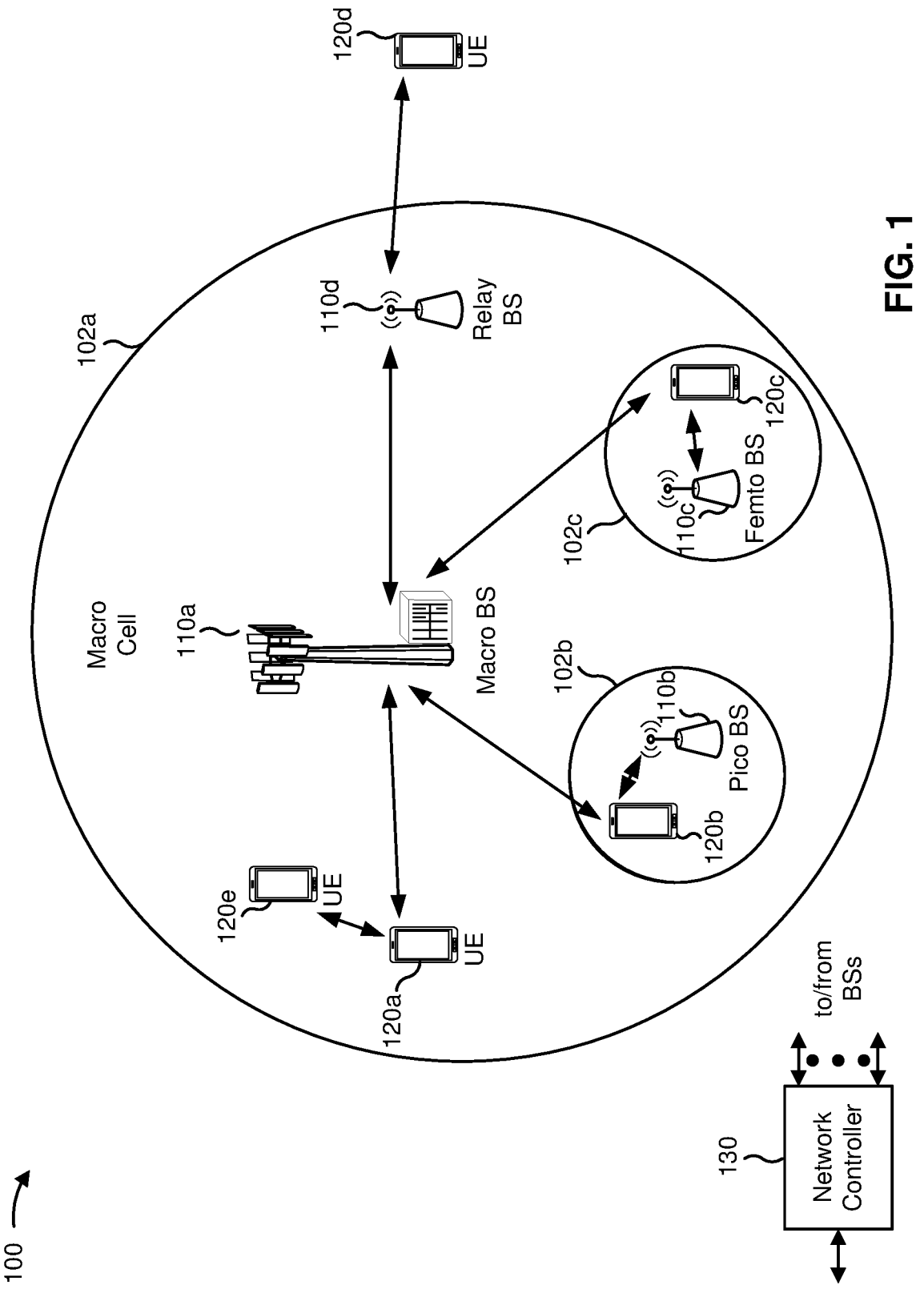
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. In some aspects, a UE 120 may be a multi-SIM UE that includes two or more SIMs.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
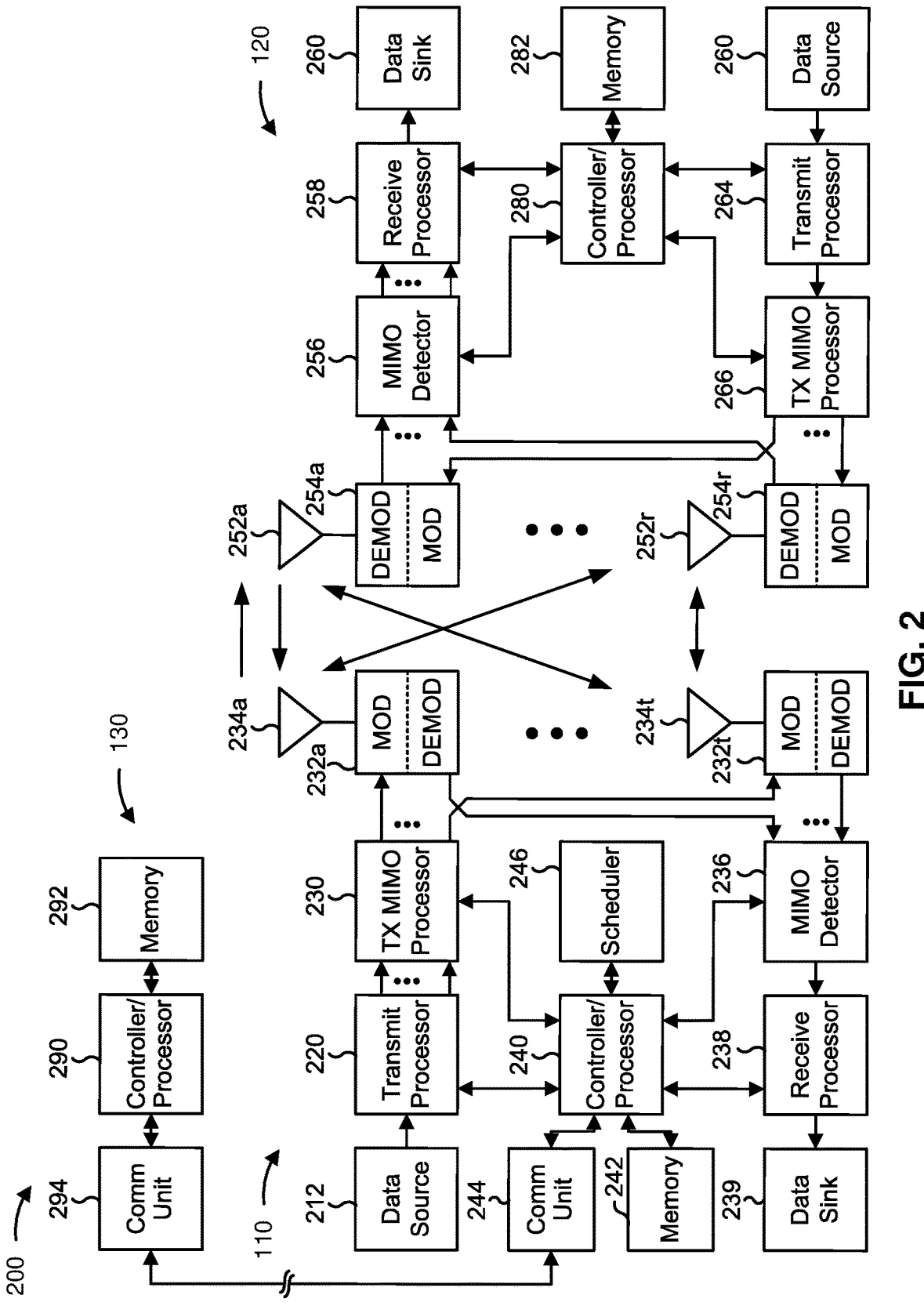
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with using a first subscription of a user equipment to perform idle mode operations for a second subscription of the user equipment, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for determining that a first subscription of the apparatus and a second subscription of the apparatus are associated with a same cell and are being used for a same radio access technology (RAT); means for activating a proxy subscription mode for the first subscription based at least in part on the determination that the first subscription of the apparatus and the second subscription of the apparatus are associated with the same cell and are being used for the same RAT, wherein the proxy subscription mode enables the apparatus to use the first subscription to perform one or more idle mode operations for the second subscription while the second subscription is in an idle mode; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
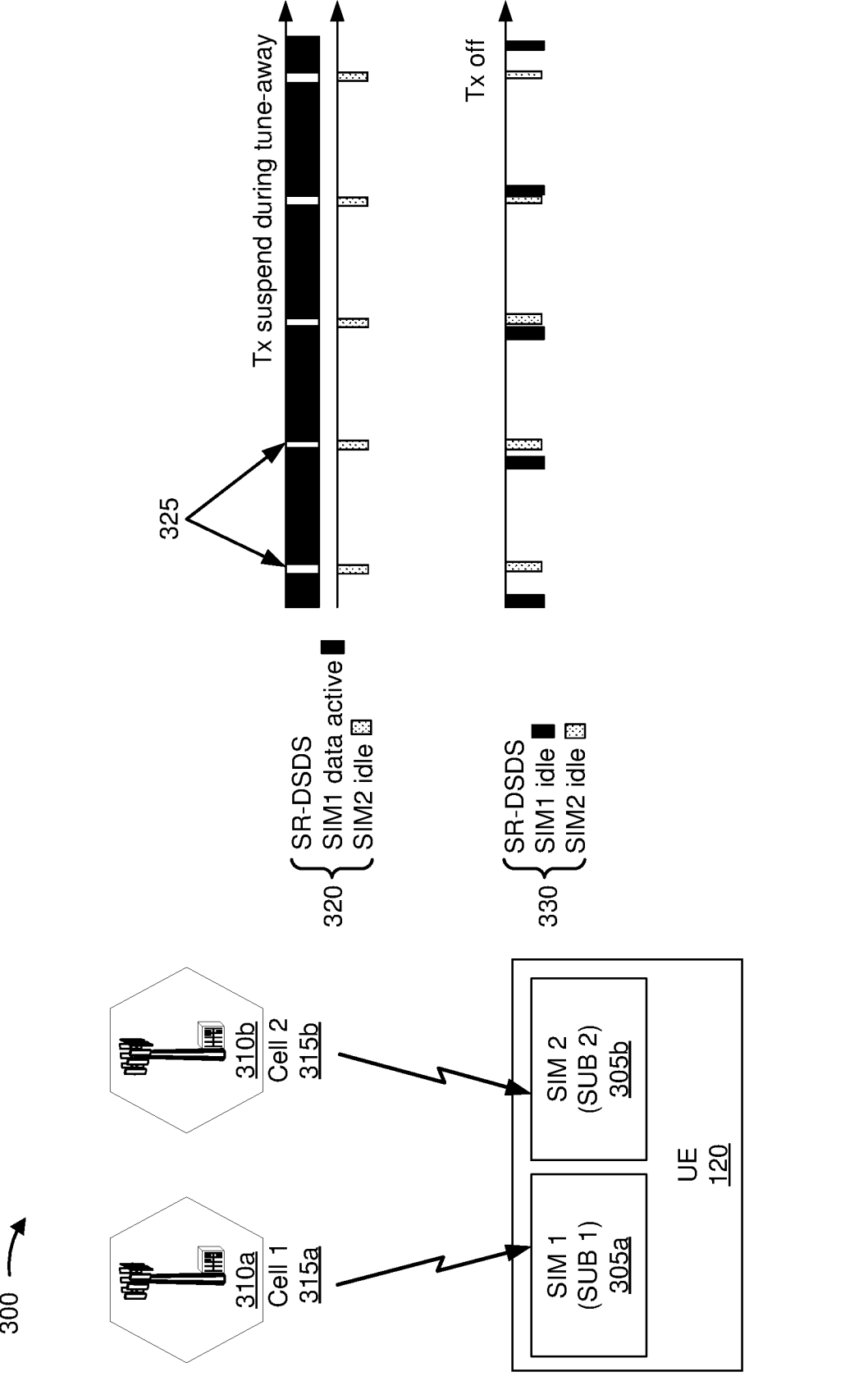
FIG. 3 is a diagram illustrating an example of operations of a multi-subscriber identity module user equipment, in accordance with various aspects of the present disclosure.

FIG. 3 is a diagram illustrating an example 300 of operations of a multi-subscriber identity module (multi-SIM) UE, in accordance with various aspects of the present disclosure.

As shown in FIG. 3, a UE 120 may be a multi-SIM UE that includes multiple SIMS (e.g., two or more SIMs), shown as a first SIM 305a and a second SIM 305b. The first SIM 305a may be associated with a first subscription (shown as SUB 1), and the second SIM 305b may be associated with a second subscription (shown as SUB 2). "Subscription" may refer to a subscription with a network operator (e.g., a mobile network operator (MNO)) that permits the UE 120 to access a wireless network (e.g., a radio access network (RAN)) associated with the network operator. A SIM 305 may be a removable SIM (e.g., a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service, a voice service, and/or the like.

As further shown in FIG. 3, the UE 120 may communicate (e.g., in a connected mode or an idle mode) with a first base station 310a via a first cell 315a (shown as Cell 1) using the first SIM 305a. In this case, a first subscription (SUB 1) of the UE 120 may be used to access the first cell 315a (e.g., using a first IMSI for UE identification, using a first security key for UE authentication, using a first list of services that the UE 120 is permitted to access using the first subscription, by counting data and/or voice usage on the first cell against the first subscription, and/or the like). Similarly, the UE 120 may communicate (e.g., in a connected mode or an idle mode) with a second base station 310b via a second cell 315b (shown as Cell 2) using the second SIM 305b. In this case, a second subscription (SUB 2) of the UE 120 may be used to access the second cell 315b (e.g., using a second IMSI for UE identification, using a second security key for UE authentication, using a second list of services that the UE 120 is permitted to access using the second subscription, by counting data and/or voice usage on the second cell against the second subscription, and/or the like). The first base station 310a and/or the second base station 310b may include one or more of the base stations 110 described above in connection with FIG. 1.

In some cases, the UE 120 may be a single radio (SR) multi-SIM UE, such as a single radio dual SIM dual standby (SR-DSDS) UE. A multi-SIM UE may be capable of switching between two separate mobile network services, may include hardware for keeping multiple connections (e.g., one connection per SIM) in a standby state, may include hardware (e.g., multiple transceivers and/or the like) for maintaining multiple network connections at the same time, and/or the like. However, an SR-DSDS UE may only be capable of receiving data on one connection at a time because radio frequency resources are shared between the multiple subscriptions. This may degrade performance of the UE 120.

For example, as shown by reference number 320, if the first subscription using SIM 1 is in a connected mode and is transmitting or receiving data, and the second subscription using SIM 2 is in an idle mode, then the UE 120 may periodically tune away from the first subscription (e.g., may tune away from Cell 1) to perform idle mode operations using the second subscription (e.g., may tune to Cell 2). For example, the UE 120 may tune to Cell 2 to monitor for paging messages (sometimes referred to as pages) and/or to perform other idle mode operations for the second subscription. As shown by reference number 325, the UE 120 operating using SR-DSDS is not capable of communicating using the first subscription while tuned to Cell 2 associated with the second subscription. As a result, the UE 120 may operate with lower throughput, higher latency, lower reliability, and/or the like for the first subscription. Furthermore, tuning between the different cells may increase power consumption and/or reduces battery life of the UE 120. In some cases, if the first subscription is connected on a voice call on the first cell, then the UE 120 may refrain from tuning away to the second cell, which may cause the UE 120 to miss a paging message (e.g., a page) for the second subscription.

In some cases, the first subscription and the second subscription may be associated with the same network operator (e.g., the same MNO). In these cases, the UE 120 may leverage an active protocol stack of one subscription to perform idle mode operations for another subscription (e.g., if connections of both SIMs are associated with the same cell and/or use the same RAT). Operating in this scenario, some techniques and apparatuses described herein may increase throughput, reduce latency, increase reliability, reduce power consumption, extend battery life, and/or otherwise improve performance of the UE 120 by permitting the UE 120 to use a first subscription to perform idle mode operations for a second subscription.

As shown by reference number 330, if the first subscription using SIM 1 is in an idle mode and the second subscription using SIM 2 is also in an idle mode, then the UE 120 may independently perform idle mode operations for the first subscription and the second subscription. For example, the UE 120 may tune to the first cell to monitor for pages for the first subscription, and may tune to the second cell to monitor for pages for the second subscription. In this case, if a paging occasion of the first cell overlaps in time with a paging occasion of the second cell, then the UE 120 may miss a page on one of the subscriptions if the UE 120 is tuned to a cell of the other subscription. Furthermore, tuning between the different cells for idle mode operations such as page monitoring may increase power consumption and/or reduce battery life of the UE 120. Also, if the UE 120 independently performs idle mode operations for different subscriptions, then the UE 120 may duplicate some idle mode operations (e.g., one or more measurements, decoding of system information, a cell reselection procedure, and/or the like), which may increase power consumption and/or reduce battery life of the UE 120.

As described above, in some cases, the first subscription and the second subscription may be associated with the same network operator. In these cases, the UE 120 may leverage an active protocol stack of one subscription to perform idle mode operations for another subscription (e.g., if connections of both SIMs are associated the same cell and/or use the same RAT). Operating in this scenario, some techniques and apparatuses described herein may reduce power consumption and/or may increase battery life of the UE 120 by permitting the UE 120 to use a first subscription to perform idle mode operations for a second subscription. Furthermore, when the UE 120 uses a first subscription to perform idle mode operations for a second subscription, the UE 120 may receive a page that the UE 120 otherwise would have missed if pages on the different subscriptions collide.

As indicated above, FIG. 3 is provided as an example. Other examples may differ from what is described with regard to FIG. 3.

Figure 4:
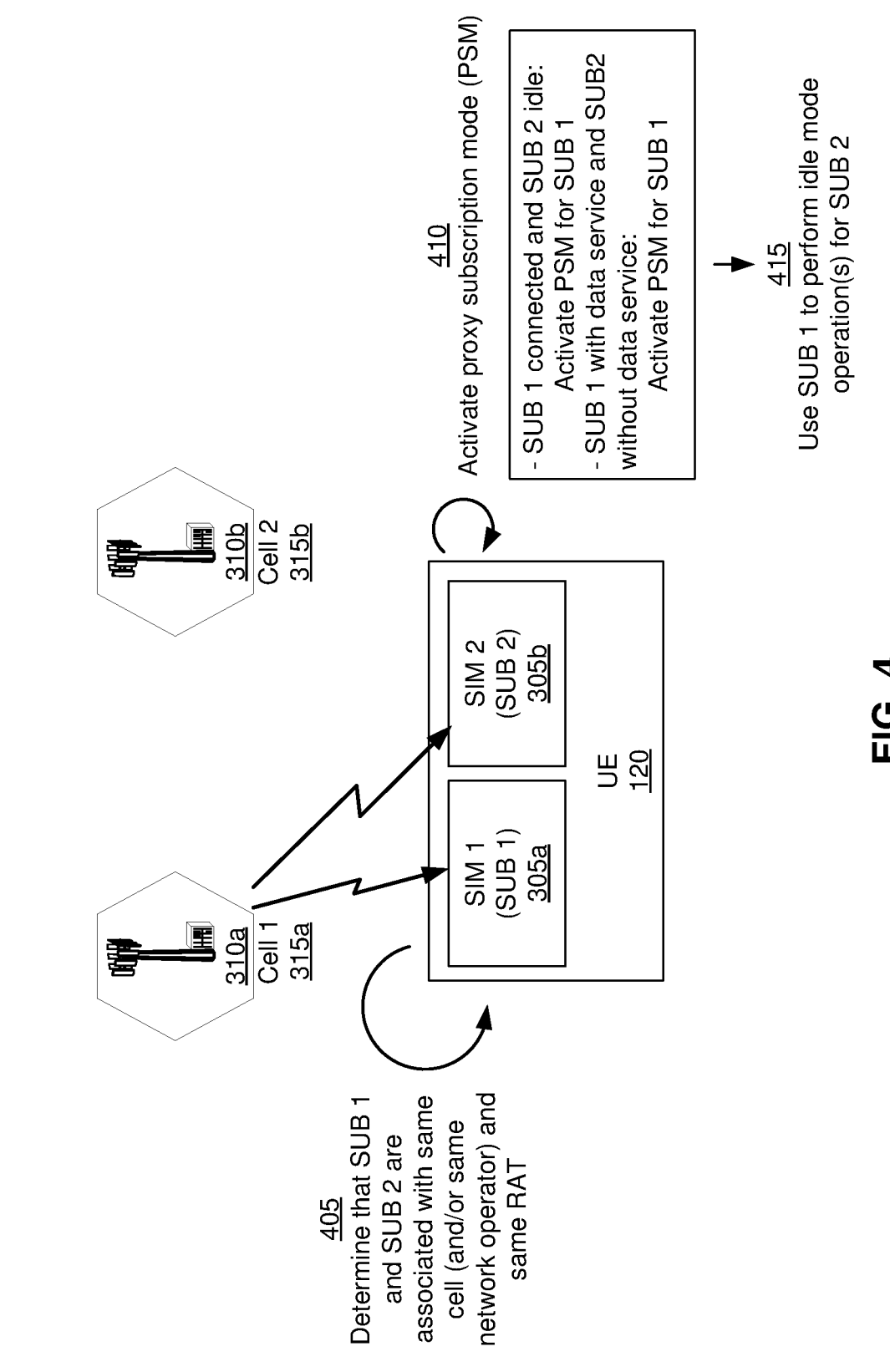
FIGS. 4-7 are diagrams illustrating examples of using a first subscription of a user equipment to perform idle mode operations for a second subscription of the user equipment, in accordance with various aspects of the present disclosure.

FIG. 4 is a diagram illustrating an example 400 of using a first subscription of a UE to perform idle mode operations for a second subscription of the UE, in accordance with various aspects of the present disclosure.

As shown in FIG. 4, a multi-SIM UE (e.g., a UE 120), such as an SR-DSDS UE, may include a first SIM 305a and a second SIM 305b, as described above in connection with FIG. 3. The first SIM 305a may be associated with a first subscription (shown as SUB 1), and the second SIM 305b may be associated with a second subscription (shown as SUB 2), as described above in connection with FIG. 3.

As further shown in FIG. 4, the first SIM 305a and the second SIM 305b of the UE 120 may both be associated with a connection to the same cell, shown as a first cell 315a (e.g., Cell 1). For example, the UE 120 may communicate with a first base station 310a via the first cell 315a using the first SIM 305a (e.g., in a connected mode or an idle mode), and may communicate with the first base station 310a via the first cell 315a using the second SIM 305b (e.g., in a connected mode or an idle mode). In this case, a first subscription of the UE 120 may be used to access the first cell 315a (e.g., using a first IMSI for UE identification, using a first security key for UE authentication, using a first list of services that the UE 120 is permitted to access using the first subscription, by counting data and/or voice usage on the first cell against the first subscription for communications that use the first subscription, and/or the like), and a second subscription of the UE 120 may also be used to access the first cell 315a (e.g., using a second IMSI for UE identification, using a second security key for UE authentication, using a second list of services that the UE 120 is permitted to access using the second subscription, by counting data and/or voice usage on the first cell against the second subscription for communications that use the second subscription, and/or the like).

As shown by reference number 405, the UE 120 may determine that the first subscription of the UE 120 and the second subscription of the UE 120 are associated with a same cell and are being used for a same RAT. For example, the UE 120 may determine that the first subscription and the second subscription are being used for a respective connection with the same cell. In some aspects, based at least in part on determining that the first subscription and the second subscription are associated with the same cell, the UE 120 may determine that the first subscription and the second subscription are associated with a same network operator and/or are being used for a same RAT. For example, because the first subscription and the second subscription are used for connections with the same cell, the first subscription and the second subscription may be associated with the same network operator and/or the same RAT, in some aspects.

Alternatively, the first subscription and the second subscription may be associated with different network operators, and the UE 120 may be roaming on the cell (e.g., the same cell) for at least one of the first subscription or the second subscription. For example, in some aspects, the first subscription is associated with a first home network of a first network operator, and the cell is associated with the first home network, while the second subscription is associated with a second home network of a second network operator and the UE 120 is roaming on the cell for the second subscription. In some aspects, the UE 120 may be roaming on the same cell for both the first subscription and the second subscription. Additionally, or alternatively, the first subscription and the second subscription may be associated with different network operators that share a radio access network on the same cell. In some aspects, the RAT is an LTE RAT (e.g., one or both SIMs may be associated with an LTE standalone mode or an NR non-standalone mode with an LTE cell as a primary cell). In some aspects, the RAT is an NR RAT (e.g., one or both SIMs may be associated with an NR standalone mode).

In some aspects, if the UE 120 determines that the first subscription and the second subscription are associated with a same cell, then the UE 120 may establish a connection for both subscriptions using the same RAT. In this case, if the subscriptions are using different RATs, then the UE 120 may switch a RAT being used for one of the subscriptions to match the other subscription. For example, the UE 120 may switch a subscription using an NR RAT to use an LTE RAT (e.g., by switching from an NR standalone RAT to an NR non-standalone RAT and/or an LTE RAT) so that both subscriptions are using the LTE RAT. Additionally, or alternatively, if the UE 120 determines that the first subscription and the second subscription are associated with a same network operator (and/or are associated with different network operators and there is an opportunity to use the same cell for roaming on at least one of the subscriptions and/or for RAN sharing), then the UE 120 may connect both subscriptions via the same cell. For example, if the subscriptions are using different cells, then the UE 120 may reselect a cell for one of the subscriptions so that both of the subscriptions use the same cell.

As shown by reference number 410, the UE 120 may activate a proxy subscription mode based at least in part on the determination that the first subscription of the UE and the second subscription of the UE are associated with the same cell and the same RAT. The proxy subscription mode may enable the UE 120 to use one of the subscriptions (e.g., one of the first subscription or the second subscription) to perform one or more idle mode operations for the other subscription (e.g., the other of the first subscription or the second subscription) while the other subscription is in an idle mode. For example, if the UE 120 activates a proxy subscription mode with the first subscription activated as a proxy for the second subscription, then the proxy subscription mode enables the UE 120 to use the first subscription to perform one or more idle mode operations for the second subscription while the second subscription is in an idle mode.

In some aspects, the UE 120 may identify a subscription to be activated as a proxy subscription for another subscription. For example, the UE 120 may select a subscription in a connected mode (e.g., a radio resource control (RRC) connected mode) to act as a proxy for a different subscription that is in an idle mode (e.g., an RRC idle mode). In example 400, if the first subscription is in the connected mode and the second subscription is in the idle mode, then the UE 120 may activate the proxy subscription mode for the first subscription. Thus, the UE 120 may activate the proxy subscription mode for the first subscription based at least in part on a determination that the first subscription is in a connected mode and the second subscription is in an idle mode. As used herein, activating the proxy subscription mode for a first subscription may refer to selecting the first subscription to act as a proxy subscription for the second subscription by performing one or more idle mode operations for the second subscription while the second subscription is in an idle mode.

As another example, the UE 120 may select a subscription associated with a data service (e.g., a subscription that includes a data service, a subscription for a SIM having a data service stored in a list of services, and/or the like) to act as a proxy for a different subscription that is not associated with a data service (e.g., a voice-only subscription, a subscription that does not includes a data service, a subscription for a SIM that does not have a data service stored in a list of services, and/or the like). In example 400, if the first subscription is associated with a data service and the second subscription is not associated with a data service, then the UE 120 may activate the proxy subscription mode for the first subscription. Thus, the UE 120 may activate the proxy subscription mode for the first subscription based at least in part on a determination that the first subscription is associated with a data service and the second subscription is not associated with a data service.

As shown by reference number 415, based at least in part on activating the proxy subscription mode for the first subscription, the UE 120 may use the first subscription to perform one or more idle mode operations for the second subscription. The proxy subscription mode may include, for example, a proxy page demodulation mode, a proxy idle mobility mode, and/or the like, as described in more detail elsewhere herein. Examples of the one or more idle mode operations that may be performed by the first subscription for the second subscription are described in more detail below in connection with FIG. 5 and FIG. 6.

By using the first subscription to perform one or more idle mode operations for a second subscription, the UE 120 may increase throughput, reduce latency, increase reliability, reduce power consumption, extend battery life, and/or otherwise improve performance of the UE 120. Furthermore, the UE 120 may reduce a likelihood that a page is missed.

As indicated above, FIG. 4 is provided as an example. Other examples may differ from what is described with regard to FIG. 4.

Figure 5:
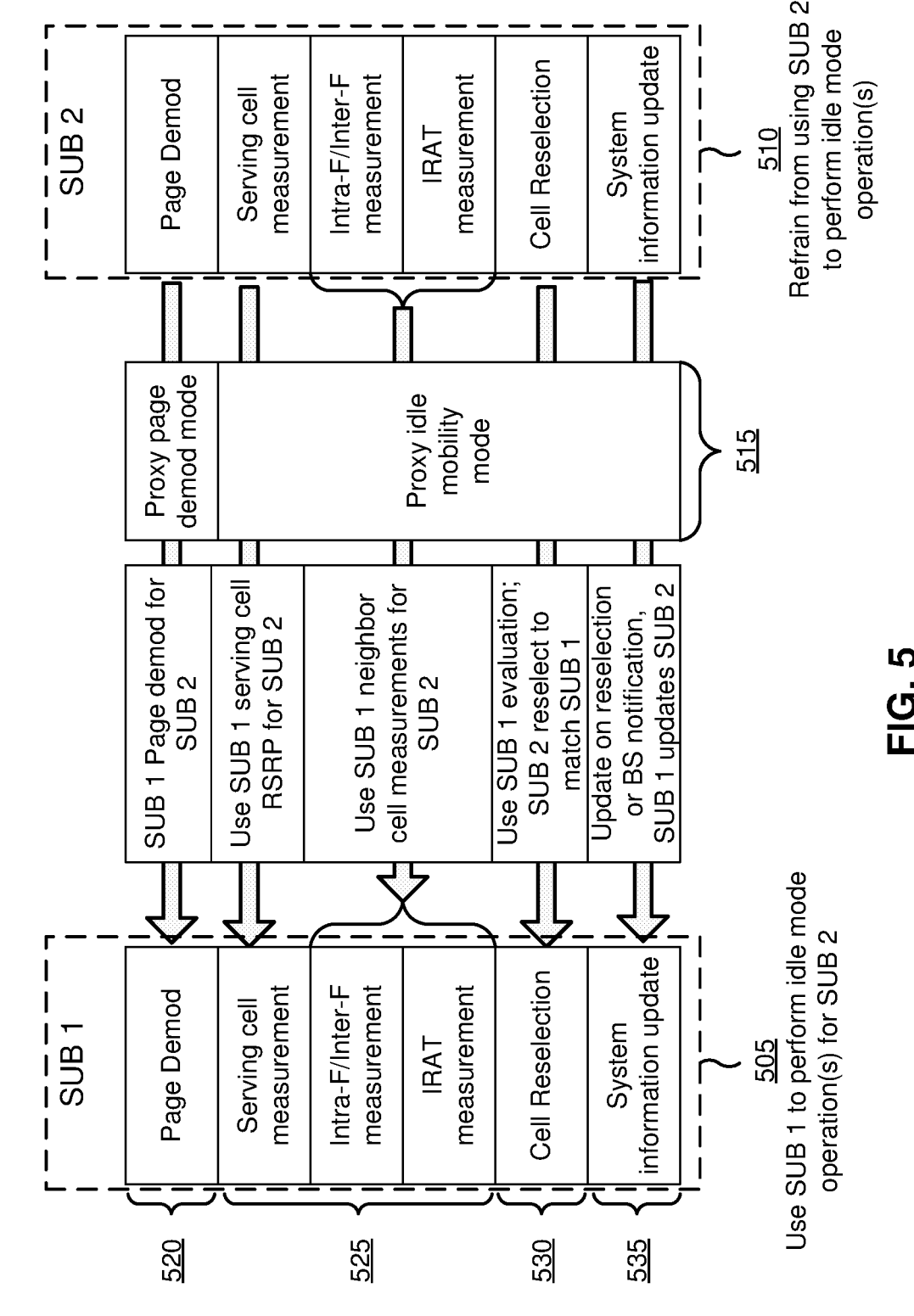

FIG. 5 is a diagram illustrating another example 500 of using a first subscription of a UE to perform idle mode operations for a second subscription of the UE, in accordance with various aspects of the present disclosure. FIG. 5 shows example idle mode operations that may be performed by a UE 120 using a first subscription (SUB 1) acting as a proxy subscription for a second subscription (SUB 2) when a proxy subscription mode is activated for the first subscription. In some aspects, the idle mode operation(s) described in connection with FIG. 5 may be performed when the first subscription and the second subscription are both associated with an idle mode (e.g., an RRC idle mode).

As shown by reference number 505, when the first subscription acts as a proxy subscription for the second subscription, the UE 120 may use the first subscription to perform one or more idle mode operations for the second subscription. As shown by reference number 510, when the first subscription acts as a proxy subscription for the second subscription, the UE 120 may refrain from using the second subscription to perform one or more idle mode operations (represented using strikethrough text). For example, the UE 120 may refrain from using the second subscription to perform one or more idle operations that are performed using the first subscription, thereby conserving resources of the UE 120 (e.g., processing power, memory, battery power, and/or the like).

As shown by reference number 515, the proxy subscription mode may include, for example, a proxy page demodulation mode, a proxy idle mobility mode, and/or the like. As shown, in the proxy page demodulation mode, the UE 120 may use the first subscription to perform page demodulation for the second subscription. As further shown, in the proxy idle mobility mode, the UE 120 may use the first subscription to perform one or more idle mobility operations associated with the second subscription, such as one or more measurements (e.g., a serving cell measurement, an intra-frequency measurement, an inter-frequency measurement, an inter-RAT measurement, and/or the like), a cell reselection procedure, a system information update, and/or the like.

As shown by reference number 520, the UE 120 may use the first subscription to demodulate one or more pages for the second subscription. Additionally, or alternatively, the UE 120 may refrain from demodulating pages using the second subscription. For example, the UE 120 may identify one or more paging occasions configured for the second subscription (e.g., according to a configuration, such as an RRC configuration). Rather than switching to the second subscription to monitor the paging occasion(s), the UE 120 may monitor the paging occasions using the first subscription, thereby conserving UE resources that would otherwise be used to switch between subscriptions. Thus, the UE 120 may use the first subscription to monitor a first set of paging occasions configured for the first subscription and to monitor a second set of paging occasions configured for the second subscription. In some aspects, the UE 120 may use a protocol stack of the first subscription to schedule page modulation in paging occasions for both the first subscription and the second subscription.

As shown by reference number 525, the UE 120 may use the first subscription to perform one or more measurements for the second subscription. Additionally, or alternatively, the UE 120 may refrain from scheduling and/or performing measurements using the second subscription. For example, the UE 120 may use measurements performed using the first subscription to perform one or more measurement-related operations for the second subscription. Because the first subscription and the second subscription are associated with the same network operator (and/or are on the same cell), such measurements may be used for both the first subscription and the second subscription. As shown, the one or more measurements may include a serving cell measurement (e.g., a reference signal received power (RSRP) measurement), a neighbor cell measurement (e.g., an intra-frequency neighbor cell measurement, an inter-frequency neighbor cell measurement, and inter-RAT (IRAT) measurement, and/or the like), and/or the like.

In some aspects, if the UE 120 changes a cell priority associated with the first subscription (e.g., due to one or more measurements performed using the first subscription, due to an RRC message, due to an RRC reconfiguration, and/or the like) while the proxy subscription mode is activated, then the UE 120 may update a cell priority associated with the second subscription to match the cell priority of the first subscription. For example, if the UE 120 modifies a first cell priority list stored by the UE 120 for the first subscription, then the UE 120 may modify a second cell priority list, stored by the UE 120 for the second subscription, to match the first cell priority list. Additionally, or alternatively, the UE 120 may use a same cell priority list for the first subscription and the second subscription while the proxy subscription mode is activated. In this way, the first subscription and the second subscription may remain camped on a same cell in the idle mode, which allows the UE 120 to use the first subscription to perform one or more idle mode operations for the second subscription.

As shown by reference number 530, in some aspects, if the UE 120 selects a new serving cell for the first subscription (e.g., using a cell selection procedure, a cell reselection procedure, and/or the like) while the proxy subscription mode is activated, then the UE 120 may also select the new serving cell for the second subscription. In some aspects, the UE 120 may apply a cell selection rule (e.g., for cell selection or cell reselection) associated with the first subscription to select a serving cell for both the first subscription and the second subscription. Additionally, or alternatively, in the proxy subscription mode, the UE 120 may ignore or override a cell selection rule associated with the second subscription (e.g., so that the cell selection rule associated with the first subscription can be used). In this way, the first subscription and the second subscription may remain camped on a same cell in the idle mode, which allows the UE 120 to use the first subscription to perform one or more idle mode operations for the second subscription.

As shown by reference number 535, in some aspects, if the UE 120 receives updated system information (e.g., in a system information block (SIB)) while the proxy subscription mode is activated, then the UE 120 may update system information for the second system using the updated system information received for the first subscription. For example, the UE 120 may receive updated system information based at least in part on performing cell reselection, based at least in part on a notification (e.g., from a base station 110) that system information has been updated, and/or the like. The UE 120 may apply the updated system information to both the first subscription and the second subscription. In this way, the UE 120 may conserve resources by reusing the system information for both the first subscription and the second subscription without switching to the second subscription to update system information for the second subscription.

In some aspects, the UE 120 may use the first subscription to receive one or more types of communications configured for the second subscription while the proxy subscription mode is activated. For example, the UE 120 may use the first subscription to receive broadcast communications configured for the second subscription (e.g., system information), to receive multicast communications configured for the second subscription, to receive evolved multimedia broadcast multicast services (eMBMS) configured for the second subscription, and/or the like. Additionally, or alternatively, the UE 120 may use the first subscription to receive one or more emergency messages, such as an Earthquake and Tsunami Warning System (ETWS) message, a Commercial Mobile Alert System (CMAS) message, a Wireless Emergency Alert (WEA) message, and/or the like. In these cases, the UE 120 may refrain from using the second subscription to receive these types of communications (e.g., broadcast messages, multicast messages, eMBMS messages, emergency messages, and/or the like).

By using the first subscription to perform one or more idle mode operations for a second subscription as described herein, the UE 120 may increase throughput, reduce latency, increase reliability, reduce power consumption, extend battery life, and/or otherwise improve performance of the UE 120. Furthermore, the UE 120 may reduce a likelihood that a page is missed.

As indicated above, FIG. 5 is provided as an example. Other examples may differ from what is described with regard to FIG. 5.

Figure 6:
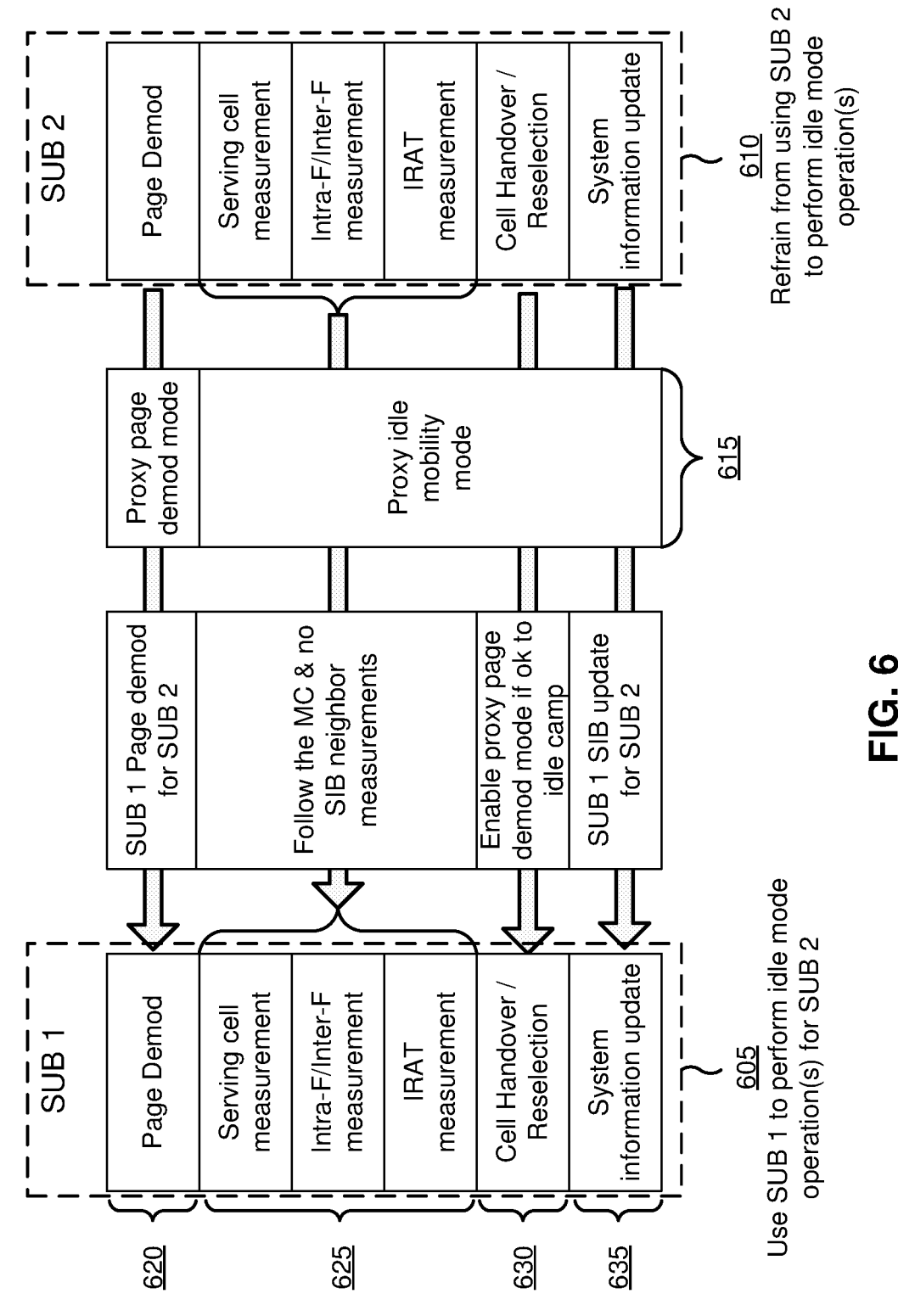

FIG. 6 is a diagram illustrating another example 600 of using a first subscription of a UE to perform idle mode operations for a second subscription of the UE, in accordance with various aspects of the present disclosure. FIG. 6 shows example idle mode operations that may be performed by a UE 120 using a first subscription (SUB 1) acting as a proxy subscription for a second subscription (SUB 2) when a proxy subscription mode is activated for the first subscription. In some aspects, the idle mode operation(s) described in connection with FIG. 6 may be performed when the first subscription is associated with a connected mode (e.g., an RRC connected mode) and the second subscription is associated with an idle mode (e.g., an RRC idle mode).

As shown by reference number 605, when the first subscription acts as a proxy subscription for the second subscription, the UE 120 may use the first subscription to perform one or more idle mode operations for the second subscription. As shown by reference number 610, when the first subscription acts as a proxy subscription for the second subscription, the UE 120 may refrain from using the second subscription to perform one or more idle mode operations (represented using strikethrough text). For example, the UE 120 may refrain from using the second subscription to perform one or more idle operations that are performed using the first subscription, thereby conserving resources of the UE 120 (e.g., processing power, memory, battery power, and/or the like).

As shown by reference number 615, the proxy subscription mode may include, for example, a proxy page demodulation mode, a proxy idle mobility mode, and/or the like. As shown, in the proxy page demodulation mode, the UE 120 may use the first subscription to perform page demodulation for the second subscription. As further shown, in the proxy idle mobility mode the UE 120 may use the first subscription to perform one or more idle mobility operations associated with the second subscription, such as one or more measurements (e.g., a serving cell measurement, an intra-frequency measurement, an inter-frequency measurement, an inter-RAT measurement, and/or the like), a cell reselection procedure, a cell handover procedure, a system information update, and/or the like.

In some aspects, if the UE 120 receives a page for the second subscription using the first subscription, then the UE 120 may determine whether to respond to or ignore the page based at least in part on a quality of service (QoS) parameter associated with data traffic being transmitted or received (or scheduled for transmission or reception) using the first subscription. For example, if the QoS level satisfies a threshold (e.g., is greater than or equal to a threshold requirement), then the UE 120 may ignore the page. If the QoS level does not satisfy the threshold (e.g., is less than or equal to a threshold requirement), then the UE 120 may respond to the page. For example, the UE 120 may respond to the page by deactivating the proxy subscription mode, establishing a connection (e.g., an RRC connection) using the second subscription, and transmitting or receiving data associated with the page using the established connection.

As shown by reference number 620, while the proxy subscription mode is activated, the UE 120 may use the first subscription to demodulate one or more pages for the second subscription and/or may refrain from demodulating pages using the second subscription, in a similar manner as described above in connection with FIG. 5. In some aspects, a page may include a page scrambled using a cell radio network temporary identifier (C-RNTI), a page scrambled using a paging radio network temporary identifier (P-RNTI), and/or the like.

As shown by reference number 625, while the proxy subscription mode is activated, the UE 120 may use the first subscription to perform one or more measurements for the second subscription and/or may refrain from scheduling and/or performing measurements using the second subscription, in a similar manner as described above in connection with FIG. 5. Additionally, or alternatively, the UE 120 may schedule and/or perform measurements according to a configuration associated with the first subscription, such as a configuration indicated in an RRC message for the first subscription. Additionally, or alternatively, the UE 120 may refrain from scheduling and/or performing measurements indicated in system information (e.g., in a SIB).

As shown by reference number 630, in some aspects, if the UE 120 is handed over to a new serving cell for the first subscription (e.g., based at least in part on a handover command from a base station 110) while the proxy subscription mode is activated, then the UE 120 may determine whether the second subscription is barred from camping on the new serving cell in an idle mode. If the second subscription is not barred from camping on the new serving cell in an idle mode, then the UE 120 may trigger cell reselection to the new serving cell for the second subscription. If the second subscription is barred from camping on the new serving cell in an idle mode, then the UE 120 may deactivate the proxy subscription mode, as described in more detail below in connection with FIG. 7. In this way, the first subscription and the second subscription may remain on a same cell if permitted, which allows the UE 120 to use the first subscription to perform one or more idle mode operations for the second subscription.

As shown by reference number 635, in some aspects, if the UE 120 receives updated system information (e.g., in a SIB) while the proxy subscription mode is activated, then the UE 120 may update system information for the second system using the updated system information received for the first subscription, as described above in connection with FIG. 5. As also described above in connection with FIG. 5, in some aspects, the UE 120 may use the first subscription to receive one or more types of communications configured for the second subscription while the proxy subscription mode is activated, such as a broadcast message, a multicast message, an eMBMS message, an emergency message, and/or the like.

By using the first subscription to perform one or more idle mode operations for a second subscription as described herein, the UE 120 may increase throughput, reduce latency, increase reliability, reduce power consumption, extend battery life, and/or otherwise improve performance of the UE 120. Furthermore, the UE 120 may reduce a likelihood that a page is missed.

As indicated above, FIG. 6 is provided as an example. Other examples may differ from what is described with regard to FIG. 6.

Figure 7:
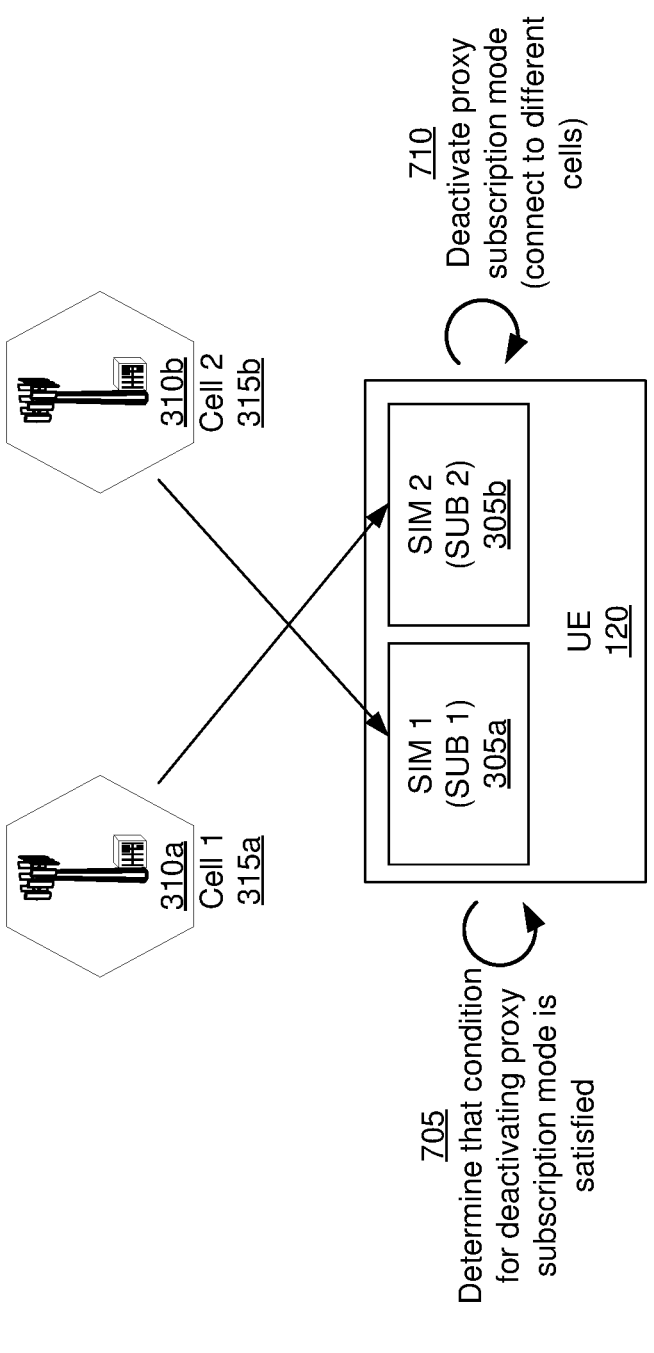

FIG. 7 is a diagram illustrating another example 700 of using a first subscription of a UE to perform idle mode operations for a second subscription of the UE, in accordance with various aspects of the present disclosure.

For the purposes of FIG. 7, a multi-SIM UE (e.g., a UE 120), such as an SR-DSDS UE, may include a first SIM 305a and a second SIM 305b, that are both associated with a connection to the same cell, as described above in connection with FIG. 4. The first SIM 305a may be associated with a first subscription (shown as SUB 1), and the second SIM 305b may be associated with a second subscription (shown as SUB 2). As also described above in connection with FIG. 4, the UE 120 may have activated a proxy subscription mode.

As shown by reference number 705, while the proxy subscription mode is activated, the UE 120 may determine that a condition for deactivating the proxy subscription mode is satisfied. For example, the UE 120 may determine that a connection associated with the first subscription has been handed over to a new cell (e.g., Cell 2), and that the second subscription is barred from camping on the new cell in idle mode, and may deactivate the proxy subscription mode based at least in part on this determination.

Additionally, or alternatively, the UE 120 may deactivate the proxy subscription mode based at least in part on a determination that the first subscription and/or the second subscription is out of service (e.g., out of a coverage area associated with the network operator). Additionally, or alternatively, the UE 120 may deactivate the proxy subscription mode based at least in part on a determination that the first subscription and the second subscription are being used for different RATs. For example, the first subscription may switch from using an LTE RAT to using an NR RAT, while the second subscription may continue to use an LTE RAT. Additionally, or alternatively, the UE 120 may deactivate the proxy subscription mode based at least in part on initiation of a public land mobile network (PLMN) search using the second subscription.

Additionally, or alternatively, the UE 120 may deactivate the proxy subscription mode based at least in part on initiation of a connection setup (e.g., of an RRC connection) using the second subscription. For example, the second subscription may initiate a connection setup to respond to a page, to originate a voice call, to receive a voice call, to transmit a communication, and/or the like. In this case, the first subscription may enter an idle mode. In some aspects, the proxy subscription mode may be activated for the second subscription in this case.

As shown by reference number 710, based at least in part on the determination that the condition is satisfied, the UE 120 may deactivate the proxy subscription mode. In some aspects, based at least in part on deactivating the proxy subscription mode, each subscription may handle its own idle mode operations (described elsewhere herein). Additionally, or alternatively, the first subscription and the second subscription may communicate using different cells. By deactivating the proxy subscription mode, the UE 120 may have the flexibility to switch between subscriptions when appropriate.

As indicated above, FIG. 7 is provided as an example. Other examples may differ from what is described with regard to FIG. 7.

FIG. 8 is a diagram illustrating an example process 800 performed, for example, by a UE, in accordance with various aspects of the present disclosure. Example process 800 is an example where a UE (e.g., UE 120 and/or the like) performs operations associated with using a first subscription of the UE to perform idle mode operations for a second subscription of the UE.

As shown in FIG. 8, in some aspects, process 800 may include determining that a first subscription of the UE and a second subscription of the UE are associated with a same cell and are being used for a same RAT (block 810). For example, the UE (e.g., using determination component 906, receive processor 258, transmit processor 264, controller/processor 280, memory 282, and/or the like) may determine that a first subscription of the UE and a second subscription of the UE are associated with a same cell and are being used for a same RAT, as described above.

As further shown in FIG. 8, in some aspects, process 800 may include activating a proxy subscription mode for the first subscription based at least in part on the determination that the first subscription of the UE and the second subscription of the UE are associated with the same cell and are being used for the same RAT, wherein the proxy subscription mode enables the UE to use the first subscription to perform one or more idle mode operations for the second subscription while the second subscription is in an idle mode (block 820). For example, the UE (e.g., using proxy subscription component 908, receive processor 258, transmit processor 264, controller/processor 280, memory 282, and/or the like) may activate a proxy subscription mode for the first subscription based at least in part on the determination that the first subscription of the UE and the second subscription of the UE are associated with the same cell and are being used for the same RAT, as described above. In some aspects, the proxy subscription mode enables the UE to use the first subscription to perform one or more idle mode operations for the second subscription while the second subscription is in an idle mode.

Process 800 may include additional aspects, such as any single aspect or any combination of aspects described below and/or in connection with one or more other processes described elsewhere herein.

In a first aspect, the proxy subscription mode is activated for the first subscription based at least in part on a determination that the first subscription is in a connected mode and the second subscription is in an idle mode.

In a second aspect, alone or in combination with the first aspect, the proxy subscription mode is activated for the first subscription based at least in part on a determination that the first subscription is associated with a data service and that the second subscription is not associated with a data service.

In a third aspect, alone or in combination with one or more of the first and second aspects, the one or more idle mode operations include demodulating a page of the second subscription in a paging occasion configured for the second subscription.

In a fourth aspect, alone or in combination with one or more of the first through third aspects, the one or more idle mode operations include one or more idle mobility operations associated with the second subscription.

In a fifth aspect, alone or in combination with one or more of the first through fourth aspects, the first subscription and the second subscription are both in an idle mode.

In a sixth aspect, alone or in combination with one or more of the first through fifth aspects, process 800 includes using one or more measurements, obtained via the first subscription, for the second subscription based at least in part on the activation of the proxy subscription mode.

In a seventh aspect, alone or in combination with one or more of the first through sixth aspects, the one or more measurements include at least one of a serving cell measurement, a neighbor cell measurement, an intra-frequency measurement, an inter-frequency measurement, an inter-RAT measurement, or a combination thereof.

In an eighth aspect, alone or in combination with one or more of the first through seventh aspects, process 800 includes refraining from scheduling or performing one or more measurements using the second subscription.

In a ninth aspect, alone or in combination with one or more of the first through eighth aspects, process 800 includes determining that a cell priority of the first subscription has changed while the proxy subscription mode is activated; and updating a cell priority of the second subscription to match the cell priority of the first subscription based at least in part on the determination that the cell priority of the first subscription has changed while the proxy subscription mode is activated.

In a tenth aspect, alone or in combination with one or more of the first through ninth aspects, process 800 includes determining that a new serving cell has been selected for the first subscription while the proxy subscription mode is activated; and selecting the new serving cell for the second subscription based at least in part on the determination that the new serving cell has been selected for the first subscription while the proxy subscription mode is activated.

In an eleventh aspect, alone or in combination with one or more of the first through tenth aspects, process 800 includes determining that system information has been updated for the first subscription while the proxy subscription mode is activated; and updating system information for the second subscription based at least in part on the updated system information for the first subscription, based at least in part on the determination that the system information has been updated for the first subscription while the proxy subscription mode is activated.

In a twelfth aspect, alone or in combination with one or more of the first through eleventh aspects, process 800 includes receiving at least one of a multicast communication, a broadcast communication, or an evolved multimedia broadcast multicast services (eMBMS) communication configured or scheduled for the second subscription based at least in part on the activation of the proxy subscription mode.

In a thirteenth aspect, alone or in combination with one or more of the first through twelfth aspects, process 800 includes receiving an emergency message for the second subscription based at least in part on the activation of the proxy subscription mode.

In a fourteenth aspect, alone or in combination with one or more of the first through thirteenth aspects, the first subscription is in a connected mode and the second subscription is in an idle mode.

In a fifteenth aspect, alone or in combination with one or more of the first through fourteenth aspects, process 800 includes determining that the first subscription has been handed over to a new cell while the proxy subscription mode is activated; determining that the second subscription is not barred from camping on the new cell in idle mode; and triggering cell reselection to the new cell for the second subscription based at least in part on the determination that the second subscription is not barred from camping on the new cell in idle mode.

In a sixteenth aspect, alone or in combination with one or more of the first through fifteenth aspects, process 800 includes refraining from performing one or more neighbor cell measurements scheduled in a system information block while the proxy subscription mode is activated.

In a seventeenth aspect, alone or in combination with one or more of the first through sixteenth aspects, process 800 includes deactivating the proxy subscription mode for the first subscription based at least in part on at least one of: a determination that at least one of the first subscription or the second subscription is out of service, a determination that the first subscription and the second subscription are being used for different RATs, initiation of a connection setup using the second subscription, initiation of a public land mobile network search using the second subscription, a determination that the first subscription has been handed over to a new cell and that the second subscription is barred from camping on the new cell in idle mode, or a combination thereof.

In an eighteenth aspect, alone or in combination with one or more of the first through seventeenth aspects, the first subscription and the second subscription are associated with a same network operator.

In a nineteenth aspect, alone or in combination with one or more of the first through eighteenth aspects, the first subscription and the second subscription are associated with different network operators, and the UE is roaming on the same cell for at least one of the first subscription or the second subscription.

In a twentieth aspect, alone or in combination with one or more of the first through nineteenth aspects, the first subscription and the second subscription are associated with different network operators that share a radio access network on the same cell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
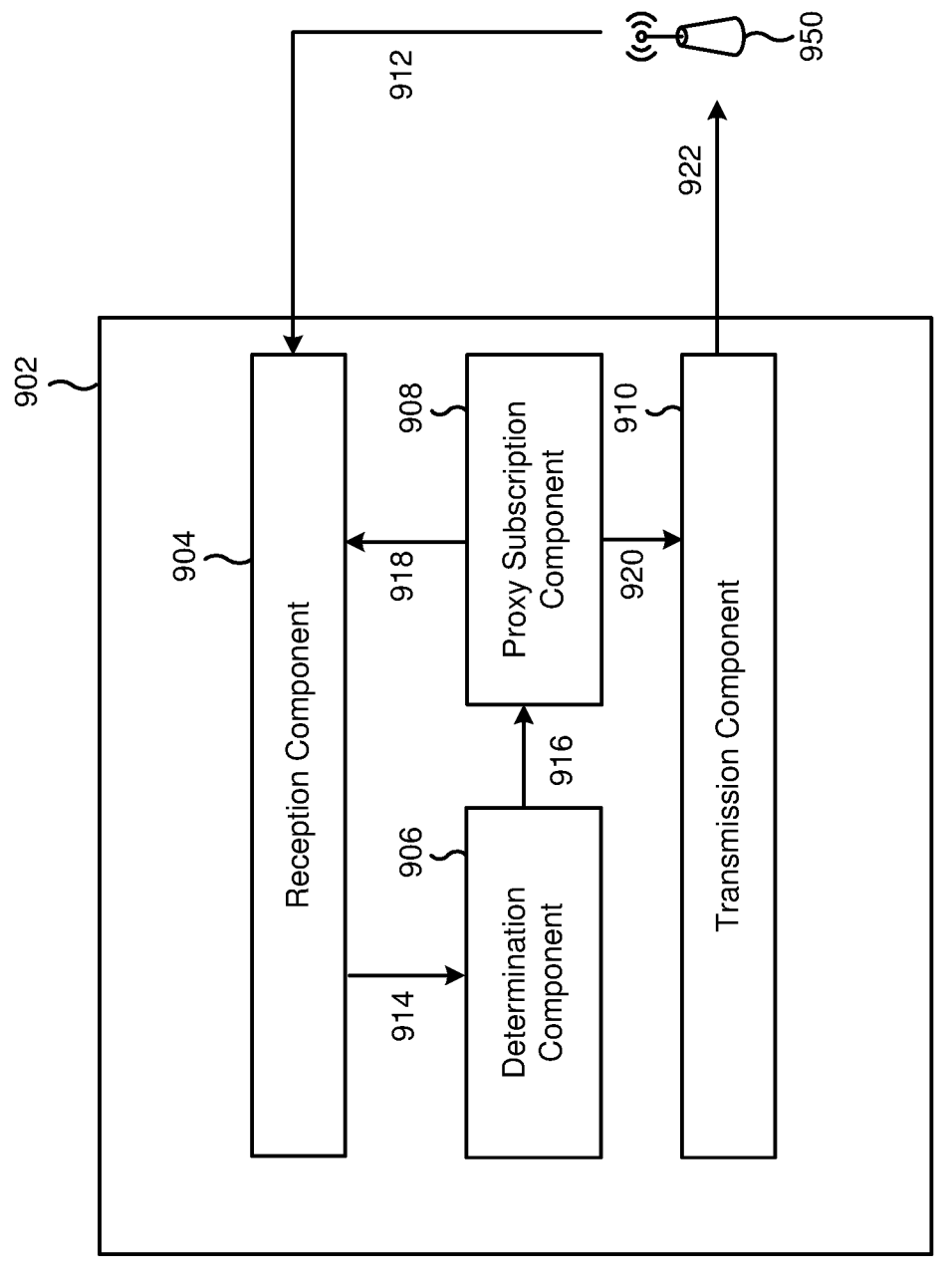
FIG. 9 is a conceptual data flow diagram illustrating a data flow between different modules/means/components in an example apparatus, in accordance with various aspects of the present disclosure.

FIG. 9 is a conceptual data flow diagram 900 illustrating a data flow between different modules/means/components in an example apparatus 902. The apparatus 902 may be a UE (e.g., UE 120 and/or the like). In some aspects, the apparatus 902 includes a reception component 904, a determination component 906, a proxy subscription component 908, and/or a transmission component 908.

The determination component 906 may determine that a first subscription of the apparatus 902 and a second subscription of the apparatus 902 are associated with a same cell and are being used for a same RAT. In some aspects, the determination component 906 may make this determination based at least in part on information 912 transmitted to the reception component 904 by an apparatus 950 (e.g., a base station 110) and provided from the reception component 904 to the determination component 906 as information 914. The proxy subscription component 908 may receive information 916 from the determination component 906 indicating that the first subscription and the second subscription are associated with a same cell and are being used for a same RAT.

The proxy subscription component 906 may activate a proxy subscription mode for the first subscription based at least in part on the determination that the first subscription and the second subscription are associated with the same cell and are being used for the same RAT. The proxy subscription mode may enable the apparatus 902 to use the first subscription to perform one or more idle mode operations for the second subscription while the second subscription is in an idle mode. In some aspects, the proxy subscription component 906 may provide information 918 to the reception component 904 and/or may provide information 920 to the transmission component 910 to enable the apparatus 902 to use the first subscription to perform one or more idle mode operations for the second subscription while the second subscription is in an idle mode.

The apparatus 902 may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

For example, the reception component 904 may include one or more of controller/processor 280, antenna 252, DEMOD 254, MIMO detector 256, receive processor 258, and/or the like. The determination component may include one or more of controller/processor 280, transmit processor 264, receive processor 258, and/or the like. The proxy subscription component may include one or more of controller/processor 280, transmit processor 264, receive processor 258, and/or the like. The transmission component may include one or more of controller/processor 280, transmit processor 264, TX MIMO processor 266, MOD 254, antenna 252, and/or the like.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

determining that a first subscription of the UE and a second subscription of the UE are associated with a same cell and are being used for a same radio access technology (RAT); and activating a proxy subscription mode for the UE based at least in part on the determination that the first subscription and the second subscription are associated with the same cell and are being used for the same RAT, wherein the proxy subscription mode enables the UE to use the first subscription to perform one or more idle mode operations, comprising a least a paging operation of the second subscription, for the second subscription while the second subscription is in an idle mode, wherein the second subscription refrains from performing the one or more idle mode operations in accordance with the proxy subscription mode, wherein the paging operation of the second subscription comprises monitoring a set of paging occasions corresponding to the second subscription.

2. The method of claim 1, wherein the first subscription and the second subscription are associated with a same network operator.

3. The method of claim 1, wherein the first subscription and the second subscription are associated with different network operators, and wherein the UE is roaming on the same cell for at least one of the first subscription or the second subscription.

4. The method of claim 1, wherein the first subscription and the second subscription are associated with different network operators that share a radio access network on the same cell.

5. The method of claim 1, wherein the proxy subscription mode is activated for the first subscription based at least in part on a determination that the first subscription is in a connected mode and the second subscription is in an idle mode.

6. The method of claim 1, wherein the paging operation further includes demodulating a page of the second subscription in a paging occasion configured for the second subscription.

7. The method of claim 1, wherein the idle mode operations further comprise a mobility operation, wherein the mobility operation includes one or more idle mobility operations associated with the second subscription.

8. The method of claim 1, wherein the first subscription and the second subscription are both in an idle mode.

9. The method of claim 1, further comprising using one or more measurements, obtained via the first subscription, for the second subscription based at least in part on the activation of the proxy subscription mode.

10. The method of claim 9, wherein the one or more measurements include at least one of a serving cell measurement, a neighbor cell measurement, an intra-frequency measurement, an inter-frequency measurement, an inter-RAT measurement, or a combination thereof.

11. The method of claim 9, further comprising refraining from scheduling or performing one or more measurements using the second subscription.

12. The method of claim 1, further comprising:

determining that a cell priority of the first subscription has changed while the proxy subscription mode is activated; and updating a cell priority of the second subscription to match the cell priority of the first subscription based at least in part on the determination that the cell priority of the first subscription has changed while the proxy subscription mode is activated.

13. The method of claim 1, further comprising:

determining that a new serving cell has been selected for the first subscription while the proxy subscription mode is activated; and selecting the new serving cell for the second subscription based at least in part on the determination that the new serving cell has been selected for the first subscription while the proxy subscription mode is activated.

14. The method of claim 1, further comprising:

determining that system information has been updated for the first subscription while the proxy subscription mode is activated; and updating system information for the second subscription based at least in part on the system information that has been updated for the first subscription based at least in part on the determination that the system information has been updated for the first subscription while the proxy subscription mode is activated.

15. The method of claim 1, further comprising receiving at least one of a multicast communication, a broadcast communication, or an evolved multimedia broadcast multicast services (eMBMS) communication configured or scheduled for the second subscription based at least in part on the activation of the proxy subscription mode.

16. The method of claim 1, further comprising receiving an emergency message for the second subscription based at least in part on the activation of the proxy subscription mode.

17. The method of claim 1, wherein the first subscription is in a connected mode and the second subscription is in an idle mode.

18. The method of claim 1, further comprising:

determining that the first subscription has been handed over to a new cell while the proxy subscription mode is activated;

determining that the second subscription is not barred from camping on the new cell in idle mode; and triggering cell reselection to the new cell for the second subscription based at least in part on the determination that the second subscription is not barred from camping on the new cell in idle mode.

19. The method of claim 1, further comprising refraining from performing one or more neighbor cell measurements scheduled in a system information block while the proxy subscription mode is activated.

20. The method of claim 1, further comprising deactivating the proxy subscription mode for the first subscription based at least in part on at least one of:

a determination that at least one of the first subscription or the second subscription is out of service, a determination that the first subscription and the second subscription are being used for different RATs, initiation of a connection setup using the second subscription, initiation of a public land mobile network search using the second subscription, a determination that the first subscription has been handed over to a new cell and that the second subscription is barred from camping on the new cell in idle mode, or a combination thereof.

21. A user equipment (UE) for wireless communication, comprising:

one or more memories; and one or more processors operatively coupled to the one or more memories, the one or more processors configured to:

determine that a first subscription of the UE and a second subscription of the UE are associated with a same cell and are being used for a same radio access technology (RAT); and activate a proxy subscription mode for the UE based at least in part on the determination that the first subscription and the second subscription are associated with the same cell and are being used for the same RAT, wherein the proxy subscription mode enables the UE to use the first subscription to perform one or more idle mode operations, comprising a least a paging operation of the second subscription, for the second subscription while the second subscription is in an idle mode, wherein the second subscription refrains from performing the one or more idle mode operations in accordance with the proxy subscription mode, wherein the paging operation of the second subscription comprises monitoring a set of paging occasions corresponding to the second subscription.

22. The UE of claim 21, wherein the proxy subscription mode is activated for the first subscription based at least in part on at least one of:

a determination that the first subscription is in a connected mode and the second subscription is in an idle mode.

23. The UE of claim 21, wherein the one or more idle mode operations further comprise at least one of: demodulating a page of the second subscription in a paging occasion configured for the second subscription, or one or more idle mobility operations associated with the second subscription.

24. The UE of claim 21, wherein the one or more processors are further configured to use one or more measurements, obtained via the first subscription, for the second subscription based at least in part on the activation of the proxy subscription mode.

25. The UE of claim 21, wherein the one or more processors are further configured to:

determine that a cell priority of the first subscription has changed while the proxy subscription mode is activated; and update a cell priority of the second subscription to match the cell priority of the first subscription based at least in part on the determination that the cell priority of the first subscription has changed while the proxy subscription mode is activated.

26. The UE of claim 21, wherein the one or more processors are further configured to:

determine that a new serving cell has been selected for the first subscription while the proxy subscription mode is activated; and select the new serving cell for the second subscription based at least in part on the determination that the new serving cell has been selected for the first subscription while the proxy subscription mode is activated.

27. The UE of claim 21, wherein the one or more processors are further configured to receive an emergency message for the second subscription based at least in part on the activation of the proxy subscription mode.

28. A non-transitory computer-readable medium storing a set of instructions for wireless communication, the set of instructions comprising:

one or more instructions that, when executed by one or more processors of a user equipment (UE), cause the UE to:

determine that a first subscription of the UE and a second subscription of the UE are associated with a same cell and are being used for a same radio access technology (RAT); and activate a proxy subscription mode for the UE based at least in part on the determination that the first subscription and the second subscription are associated with the same cell and are being used for the same RAT, wherein the proxy subscription mode enables the UE to use the first subscription to perform one or more idle mode operations, comprising a least a paging operation of the second subscription, for the second subscription while the second subscription is in an idle mode, wherein the second subscription refrains from performing the one or more idle mode operations in accordance with the proxy subscription mode, wherein the paging operation of the second subscription comprises monitoring a set of paging occasions corresponding to the second subscription.

29. An apparatus for wireless communication, comprising:

means for determining that a first subscription of the apparatus and a second subscription of the apparatus are associated with a same cell and are being used for a same radio access technology (RAT); and means for activating a proxy subscription mode for the apparatus based at least in part on the determination that the first subscription and the second subscription are associated with the same cell and are being used for the same RAT, wherein the proxy subscription mode enables the apparatus to use the first subscription to perform one or more idle mode operations, comprising a least a paging operation of the second subscription, for the second subscription while the second subscription is in an idle mode, wherein the second subscription refrains from performing the one or more idle mode operations in accordance with the proxy subscription mode, wherein the paging operation of the second subscription comprises monitoring a set of paging occasions corresponding to the second subscription.

30. The method of claim 1, wherein the idle mode operations further comprise at least one of a cell reselection procedure, a cell handover procedure, or a system information update.

* * * * *